United States Patent [19]

Shah et al.

[11] Patent Number: 5,302,462
[45] Date of Patent: Apr. 12, 1994

[54] SHELF-STABLE POLYESTER/HMMM POWDER COATING

[75] Inventors: Navin B. Shah; Andrew T. Daly, both of Sinking Spring, Pa.

[73] Assignee: Morton International, Inc., Chicago, Ill.

[21] Appl. No.: 848,514

[22] Filed: Mar. 9, 1992

[51] Int. Cl.$^5$ .............................. B32B 27/42
[52] U.S. Cl. ................... 428/482; 525/437;
525/443; 525/467; 525/472; 528/272; 528/296;
528/300; 528/301; 528/302; 528/308;
528/308.6; 528/423; 528/503; 428/458;
428/460; 428/524
[58] Field of Search ............... 525/437, 443, 467, 472,
525/423, 272, 296, 300, 301, 302, 308, 308.6,
503; 428/458, 460, 482, 524

[56] References Cited

U.S. PATENT DOCUMENTS

| | | | |
|---|---|---|---|
| 3,759,854 | 9/1973 | Chang et al. | 260/21 |
| 3,919,350 | 11/1975 | Iwasawa et al. | 260/850 |
| 3,919,352 | 11/1975 | Iwasawa et al. | 260/856 |
| 3,954,901 | 5/1976 | Watanabe et al. | 260/850 |
| 3,980,732 | 9/1976 | Isaksen et al. | 260/850 |
| 4,075,261 | 2/1978 | Fujiyoshi et al. | 525/443 |
| 4,102,943 | 7/1978 | Isaksen et al. | 260/850 |
| 4,189,421 | 2/1980 | Shay et al. | 260/38 |
| 4,190,714 | 2/1980 | Isaksen et al. | 525/163 |
| 4,190,715 | 2/1980 | Isaksen et al. | 525/163 |
| 4,230,829 | 10/1980 | Yoshihara et al. | 525/162 |
| 4,352,924 | 10/1982 | Wooten et al. | 528/302 |
| 4,442,270 | 4/1984 | Passmore et al. | 525/440 |

OTHER PUBLICATIONS

Kirk–Othmer, "Powder Coatings to Recycling," *Encyclopedia of Chemical Technology*, Third Edition, vol. 19, p. 11.

*Primary Examiner*—John Kight, III
*Assistant Examiner*—Sam A. Acquah
*Attorney, Agent, or Firm*—Robert M. Didrick; Gerald K. White

[57] ABSTRACT

The reaction of less than the stoichiometric amount of a methoxymethyl aminotriazine with a linear, hydroxyl-terminated polyester in a mixture of the two wherein the polyester to triazine ratio is from about 97:3 to about 70:30 by weight affords a storage stable coating powder which forms an attractive, pin hole-free film when fused on a substrate at thicknesses of from about 3.9 to about 6.8 mils.

14 Claims, No Drawings

SHELF-STABLE POLYESTER/HMMM POWDER COATING

This invention relates to a thermosettable polyester resin composition useful as a coating powder when crosslinked with a conventional aminoplast. More particularly, it relates to the use of a methoxylated aminoplast in a manner that avoids the problems of blocking of the powder and outgassing of the coating.

Polyester coating powders have been preferred for exterior applications for a number of years because of the excellent weatherability of the triglycidyl isocyanurate cured polyester resin. Before the advent of the TGIC-cured resin, curing of hydroxy-functional polyesters with hexa(methoxymethyl) melamine (HMMM) was tried but the HMMM lowered the $T_g$ of the resin/hardener system which created a severe problem of powder blocking during storage, according to D. S. Richart at page 11, Vol. 19, *Kirk & Othmer's Encyclopedia of Chemical Technology*, John Wiley & Sons, Inc. (1982). The author went on to say that that problem and the problem of surface haze due to microscopic imperfections caused by the evolution of methanol during curing were never successfully resolved and that the polyester/HMMM product was removed from the market. For cost and other reasons, it would be desirable to have a true alternative to the TGIC-cured polyester powder, i.e., one that does not clump together at normal storage temperatures and that can be built up to a commercially acceptable thickness without the surface defects caused by the escape of methanol from the resin as it undergoes the following reaction:

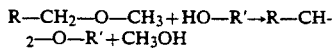

wherein R is a urea, melamine, or benzoguanamine radical, and R' is the backbone of a hydroxyl-, carboxyl-, or amido- terminated polyester.

Several solutions to the problem have been proposed since the use of hexa(methoxymethyl) melamine as a curing agent for polyester coating powders was described in U.S. Pat. No. 3,759,854, wherein desirably stable powders were said to have a softening point of at least 65° C. According to U.S. Pat. No. 3,980,732, attempts to produce coating powders based on systems which contain aminoplast crosslinking agents and acrylic or polyester resins having reactive hydrogen groups such as hydroxyl, carboxyl, or amide have given unsatisfactory results because of poor package stability. Said poor stability is associated with the plasticizing and cold flow effects of the conventional low molecular weight aminoplasts, according to the '732 patent. It goes on to say that the cold flow may be avoided by cutting back on the quantity of aminoplast but with a sacrifice in physical properties and solvent resistance of the cured film. The use of high molecular weight resins to solve the blocking problem is an expedient which impairs fusibility of the powder and the flow so that the coating lacks gloss and coherence. Resins having a high glass transition temperature are unsatisfactory, it continues, because a cured film from the powdered resin is brittle and has low impact strength. The solution offered in the '732 patent is to react a conventional aminoplast crosslinking agent such as a methylolaminotriazine first with a $C_1$-$C_4$ aliphatic alcohol and then with a second compound such as ethylene glycol or terephthalamide which has a reactive hydroxyl or amide group. The modified agent has a higher glass transition temperature so that the blend of crosslinker and polyester resin constituting the powder will have a sintering temperature above 40° C. and, hence, a better package stability than blends containing the conventional aminoplasts.

A similar approach to the problems of blocking and outgassing is disclosed in U.S. Pat. No. 4,189,421. Solid addition products from the condensation of a phenol and an alkoxymethyl amino-triazine having a softening point above 100° C. are taught to be improved crosslinking agents for polymers containing carboxyl, anhydride, epoxy, hydroxyl, or amide groups.

In U.S. Pat. No. 4,230,829, it is said that powder coating compositions are known which contain a vehicle component prepared by partially reacting a mixture of a hydroxyl-containing resin and an alkoxyamino compound in the weight ratio ranging from 97:3 to 80:20 until a reaction efficiency of about 10% is reached. In a teaching evocative of the '732 patent above, the '829 patent teaches that the large proportion of hydroxyl-containing resin is likely to cause a partial crosslinking to occur, thus causing difficulty in forming a smooth coating layer by direct application of the composition.

It is an object of this invention, therefore, to provide the first commercially acceptable coating powder based on amino crosslinking agents.

It is a related object of the invention to provide a polyester-based coating powder which forms a smooth layer when fused in place on a substrate.

It is a further related object of the invention to provide a storage-stable coating powder which is ready for application, fusing, and curing to give a film of commercially acceptable thickness without outgassing and the concomitant surface defects.

It is yet another related object of this invention to provide a partially cured but non-gelled coating powder composition wherein hexa(methoxymethyl)melamine (HMMM) is the crosslinking agent as a true alternative to the TGIC-cured polyester-based powder.

These and other objects which will become apparent from the following disclosure are achieved by a process which comprises mixing a linear, hydroxyl-terminated polyester with a methoxymethyl aminotriazine in a ratio of from about 97:3, preferably 95:5, to about 70:30 by weight at an elevated temperature to react a portion, less than the stoichiometric amount, of the aminotriazine and form the methanol by-product. The reaction mixture becomes progressively thicker as partial advancement takes place. If the polyester/aminotriazine ratio is less than 90:10, more polyester may be added to the partially cured material to raise the ratio to 90:10 or above. The product may then be cooled, comminuted, and combined with pigments, additives, and catalysts to form a non-gelled, storage stable powder which, when applied to a substrate, fused, and cured, will provide a smooth, pin hole-free film on the surface of the substrate. Some of the methanol escapes at the elevated temperature through normal volatilization but it is much preferred to remove the methanol by stripping the reaction mixture under reduced pressure, being careful not to fully cure the polyester.

The partial curing of the polyester resin is carried out at a temperature of from about 150° C. to about 170° C. and preferably at a pressure of from about 100 mm to about 650 mm. As was indicated earlier, atmospheric pressure may be employed. A much lower pressure could be used to effect the partial curing in a shorter time but a practical difficulty arises in the condensation and measurement of the methanol being removed from the reaction mixture. The volume or weight of the methanol condensed at an appropriately low temperature or the loss in weight of the reaction mixture may be used to draw up a schedule of residence time, temperature, and pressure required to remove a desired amount of methanol. In any event, the removal of methanol is continued until a reaction efficiency of from about 5% to about 15% is achieved.

A particularly preferred method for accomplishing the partial cure is to pass the reaction mixture through an extruder while pulling a partial vacuum. A cross-linking agent such as hexa(methoxymethyl) melamine may be metered into the extruder as a liquid or it may be added as a dry powder by first admixing it with a solid organic resin which will absorb it and then pulverizing the solid. The latter may be more convenient for small scale work but metering avoids the costly processing steps. Ciba-Geigy's RD 90-308 product is an example of a cross-linking agent in the form of a dry powder.

Methoxymethylaminotriazines are prepared by methoxylating methylolmelamines and methylolbenzoguanamines with methyl alcohol by known methods. The etherification proceeds under acidic conditions. A temperature of from 30° to 120° and a reduced pressure of from 40 to 100 mm of Hg may be used. Preferably, the methylolated aminotriazine starting material will have no more than one non-methylolated NH bond per triazine ring. At least 80% of the methylol groups will be etherified with the alcohol. A preferred example is the HMMM sold by American Cyanamid under the trademark Cymel® 303.

The linear polyesters which are useful in this invention have an OH value of from 15 to 55, preferably 20 to 35, a glass transition temperature of from about 40° C. to about 100° C., and an acid value of up to about 10. The Tg is preferably higher than 50° C. because of its effect on the blocking problem. They are the condensation products of bifunctional carboxylic acids and alcohols. The trifunctional acids and alcohols cause the undesired crosslinking mentioned in U.S. Pat. No. 4,230,829 and noted above. Examples of carboxylic acids useful for the preparation of such polyester resins are phthalic acid, tetra- and hexahydrophthalic acids and their anhydrides, adipic acid, sebacic acid, terephthalic and isophthalic acids, 1,3- and 1,4-cyclohexane-dicarboxylic acids, esters of such acids and mixtures of all. Ethylene-, diethylene-, propylene-, and trimethylene glycol exemplify the bifunctional alcohols, along with other dihydric alcohols such as hexanediol, 1,3-, 1,2-, and 1,4-butanediols, neopentyl glycol, 2-butyl-2-ethyl1,3-propanediol, 2-methyl-1,3-propanediol, 1,4-cyclohexanediol and mixtures of all. Condensation of the acids and alcohols is a well known reaction and various processes for carrying it out are also well known. The temperature is suitably from about 180° C. to about 300° C.; an azeotropic distillation with a solvent or a stream of an inert gas through a molten mixture of the reactants may be used to enhance the removal of water formed by the condensation; and a catalyst such as p-toluenesulfonic acid or dibutyltin oxide may be used. An ester interchange reaction catalyzed by a lead carboxylate or oxide, zinc acetate, lithium hydroxide or carboxylate may be used at temperatures of 200° to 300° C.

The final curing of the coating powder while it is in place on the substrate is performed at a temperature of from about 150° C. to about 250° C. (about 300° to about 480° F.) for from about 5 to about 30 minutes. The fully cured film contains from about 5 to about 10 parts of the triazine per hundred parts of the polyester resin. Smooth, pin-hole free films as thick as 6.8 mils can be put on a substrate at a curing temperature of about 375° F. (about 190° C.) as compared to a maximum thickness of about 4.5 mils obtained at that curing temperature with a coating powder which has not undergone the partial curing step of this invention. At a curing temperature of 400° F. (about 204° C.), the films of this invention are still thicker before outgassing is evident than those cured without the partial curing of this invention.

The invention is described in greater detail in the following examples in which the parts and percentages are by weight unless otherwise indicated.

EXAMPLE I

A hydroxyl-terminated polyester was prepared by melting 910 parts (17.5 equivalents) of neopentyl glycol, 1328 parts of (16.0 equivalents) terephthalic acid, and 58 parts (0.8 equivalent) of adipic acid in a reaction vessel and gradually raising the temperature to 240° C. over a period of 14–16 hrs. until the acid number was 5.0 (mg KOH/G resin). The resulting resin had a hydroxyl value of 23.3, and its ICI viscosity at 200° C. was 4800 cps. The temperature was maintained at from 150° C. to 170° C. as hexa(methoxymethyl) melamine (Cymel 303 curing agent) was added to the resin to make 5% of the mixture and thoroughly mixed to effect a partial curing of the polyester and thereby cause the viscosity to increase.

EXAMPLE II

The general procedure of Example I was followed except that 775 parts (14.9 equivalents) of neopentyl glycol, 265 parts (2.6 equivalents) of the acid ester of neopentyl glycol and hydroxy pivalic acid, and 1386 parts (16.7 equivalents) of the terephthalic acid were used to give a resin having an acid number of 4.2, a hydroxyl value of 23.3 (mg KOH/G resin), and an ICI viscosity of 4500 cps. The mixture was degassed for about 15 minutes at a pressure of 600–650 mm to remove methanol.

EXAMPLE III

Two thousand parts of a hydroxyl-terminated polyester sold under the trademark, Arakote 3109, and having an acid number of 4 (max.), a hydroxyl value of 29–33, a Tg of 55.6° C., and a viscosity at 200° C. of 4000–5000 cps was melted under a nitrogen blanket in a resin kettle at 150° C. To the molten resin, 105 parts of the Cymel 303 curing agent were added slowly and mixed as the temperature was maintained at 155°–162° C. Vacuum was gradually applied to reach a pressure of from 400 to 350 mm Hg for thirty minutes and 3.2 parts of condensate was distilled from the mixture. This corresponds to a reaction efficiency of about 8%.

EXAMPLE IV

The general procedure of Example III was repeated except that the vacuum was from 300–350 mm. The amount of condensate collected was 4.7 parts, which corresponds to an efficiency of 12%.

EXAMPLE V

The general procedure of Example III was repeated except that 1350 parts of the resin and 150 parts of the Cymel 303 curing agents were used. Also, the pressure was reduced to 250-200 mm Hg over 30 minutes. About six parts of condensate were collected.

EXAMPLE VI

The mixing procedure of Example II was repeated except that 127.7 parts of a tetramethoxymethyl glycouril were added to the two thousand parts of polyester. The mixture was held under a vacuum for 30 minutes and 1.4 parts of condensate were collected.

EXAMPLE VII

The general procedure of Example VI was repeated except that the vacuum was held for 45 minutes and 2.4 parts of condensate were collected.

COATING POWDER EXAMPLES A-H

Coating powders were made from each of the products of the above examples by dry blending the components given in Table 1 and extruding the blend through a Buss Type PR-46 extruder at 180°-200° F. The extrudate was cooled, pulverized, and screened through a 140 mesh screen.

of the R-902 pigment, 10 parts of Bartex 65 (generic name), and 3.4 parts of other pigments.

The coating powders of Examples A-H and of the Comparative Examples were sprayed with an electrostatic spray gun onto cold-rolled steel panels and cured at the temperature and for the time shown in Table 2. The results of testing the coated panels are also given in Table 2. As shown, acceptable films having thicknesses of from 3.9 to 4.9 mils were formed at 400° F. by the powders of this invention as compared to 3.2 and 3.4 mils for the films in the comparative Examples.

Procedures for the tests are as follows:

Gel time—ASTM D-3451.14
Impact—ASTM D-2794
Pencil hardness—ASTM D-3363
Gloss—ASTM D-523
HPMF—A 12.7 mm d×6 mm thick powder pellet is placed on a hot plate set at 375° F. (190° C.±2°) at an inclination angle of 35°. The pellet melts and runs down the plate. The distance from the uppermost point of the original pellet to the extreme lower point is measured and reported as hot plate melt flow.
Outgassing—Measure thickness at which imperfections

TABLE 1

| Component | Coating Powder Formulation (parts by weight) | | | | | | | |
|---|---|---|---|---|---|---|---|---|
| | A | B | C | D | E | F | G | H |
| Resin of Example I | 100 | | | | | | | |
| Resin of Example II | | 100 | | | | | | |
| Resin of Example III | | | 100 | 100 | | | | |
| Resin of Example IV | | | | | 100 | | | |
| Ciba 3109 Resin | | | | | | 50 | | |
| Resin of Example V | | | | | | 50 | | |
| Resin of Example VI | | | | | | | 100 | |
| Resin of Example VII | | | | | | | | 100 |
| Resiflow P-67 (flow control agent) | 2 | 2 | 2 | 2 | 2 | 2 | 2 | 2 |
| Uraflow B (flow control agent) | 2 | 2 | 2 | 2 | 2 | 2 | 2 | 2 |
| Hubercarb Q4 filler | 20 | — | — | — | — | — | — | — |
| R-902 pigment | 50 | 50 | 50 | 50 | 50 | 38 | 38 | 38 |
| Ciba 89-297 catalyst | 0.33 | 0.33 | 0.33 | 0.5 | 0.33 | 0.5 | — | — |
| MTSI* catalyst | — | — | — | — | — | — | 0.5 | 0.5 |
| Bartex 65 filler | — | — | — | — | — | 10 | 10 | 10 |
| Pigments | — | — | — | — | — | 3.4 | 3.4 | 3.4 |

*methyl tolysulfonimide by American Cyanamid

COMPARATIVE EXAMPLE 1

A coating powder was made according to the general procedure of Examples A-H from ninety-four (94) parts of Arakote 3109 polyester, 6 parts of the Cymel 303 curing agent, 2 parts each of the Resiflow and Uraflow agents, 20 parts of the Hubercarb filler, 50 parts of the R-902 pigment, and 0.33 part of the 89-297 catalyst.

COMPARATIVE EXAMPLE 2

Another coating powder was made by the general procedure of Examples A-H from 90 parts of the 3109 polyester, 8.6 parts of Ciba-Geigy's RD 90-308 (Cymel 303 on a resin carrier), 0.5 part of the 89-297 catalyst, 2 parts each of the Resiflow and Uraflow agents, 38 parts in the coating due to vapor escape at a specified temperature become visible.

MEK resistance—A cotton swab soaked with methyl ethyl ketone is used to give 50 double rubs to a coated panel. On a scale of 1-5, 1 is the worst rating and is given when a complete rub off occurs; 5 means no effect observed.

Blocking resistance—A one inch (2.54 cm) layer of the powder is placed in a test tube and a 100 gram weight is set on top of the powder. The tube, powder and weight are then placed in an air circulation oven at 110° F. (43° C.) for 24 hours, whereupon the condition of the powder is rated on a scale of 1 to 10. A rating of 1 means no change and 10 means there was complete blocking.

TABLE 2

| | Coating Powder | | | | | | | | C.E. 1 | C.E. 2 |
|---|---|---|---|---|---|---|---|---|---|---|
| | A | B | C | D | E | F | G | H | | |
| Curing temperature (°F.) | 400 | 400 | 400 | 400 | 400 | 400 | 400 | 400 | 400 | 400 |
| Curing time (minutes) | 20 | 20 | 15 | 15 | 15 | 15 | 15 | 15 | 20 | 15 |
| Gel time (seconds) | 182 | 140 | 167 | 148 | 160 | 193 | 203 | 213 | 239 | 252 |
| Impact-Direct/Reverse | 160 | 160 | 160/160 | 160/160 | 160/160 | 160/160 | 160/160 | 160/160 | 160 | 160/160 |
| Pencil hardness | | | Pass-F | Pass-F | Pass-F | B | B | B | | B |

TABLE 2-continued

|  | Coating Powder |  |  |  |  |  |  |  | C.E. 1 | C.E. 2 |
|---|---|---|---|---|---|---|---|---|---|---|
|  | A | B | C | D | E | F | G | H |  |  |
| Gloss |  |  |  |  |  |  |  |  |  |  |
| 20° C. |  |  | 80 | 83 | 62 | 68 | 68 | 68 |  | 64 |
| 60° C. | 77 | 94 | 95 | 94 | 85 | 90 | 90 | 90 | 78 | 88 |
| Appearance |  |  | Smooth | Smooth | Smooth |  |  |  |  |  |
| MEK Resistance |  |  | 4 | 4 | 4 | 4 | 4 | 4 |  | 4 |
| (50 double rubs) |  |  |  |  |  |  |  |  |  |  |
| Outgassing at | 4.0 | 4.9 | 4.3 | 4.3 | 4.3 | 3.9 | 4.3 | 4.3 | 3.2 | 3.4 |
| ... mils film thickness |  |  |  |  |  |  |  |  |  |  |
| Blocking resistance |  |  |  |  |  |  |  |  |  |  |
| 1 day | 5 |  | 3 | 3 | 4 | 3 | 5 | 5 | 6 | 6 |
| 1 week |  |  | 3 | 4 | 4 |  |  |  |  |  |
| HPMF (mm) |  |  | 84 | 91 | 91 | 83 | 78 | 74 |  | 92 |

EXAMPLE VIII

A free-flowing powder was made by mixing 60 parts of hexa(methoxymethyl) melamine with 40 parts of an absorbent organic resin. A blend of 8.5 parts of the powder with 95 parts of Arakote 3109 polyester was extruded through a Werner & Pfleiderer Model ZSK-30 twin screw extruder at a screw speed of 300 rpm and a throughput rate of 27 pounds/hour. The temperature was 150° C.; the Vacuum Level 1 was 25 in (Hg) and the Vacuum Level 2 was 19 in (Hg). The extrudate (103.5 parts) was cooled and broken into chips and then blended with the Resiflow P-67 and Uraflow flow control agents (1.2 and 2.0 parts, respectively), 0.5 part of the Ciba 89-297 catalyst, and 60 parts of TiO$_2$. The dry blend was then extruded through a Buss Type PR-46 extruder at 180°-200° F. and the extrudate was cooled, pulverized and screened to make the powder coating J.

COMPARATIVE EXAMPLE 3

To 95 parts of the Arakote 3109 resin there were added 8.5 parts of a free flowing powder made by admixing 60 parts of hexa(methoxymethyl) melamine with 40 parts of an absorbent organic resin essentially the same as that of Example VIII. The flow control agents, catalyst, and pigment were added to the resin in accordance with Example VIII. The blend was extruded through a Buss Type PR-46 extruder at 180°-200° F. and the extrudate was cooled, pulverized and screened to make a coating powder in which no partial curing has occurred.

The coating powder J and that of Comparative Example 3 were sprayed with an electrostatic spray gun onto cold-rolled steel panels and cured at temperature and for the time shown in Table 3. The maximum thickness at which films of those powder coatings are devoid of imperfections caused by outgassing are shown in Table 3 along with other important properties.

TABLE 3

|  | Curing Temperature and Time |  |  |  |  |  |
|---|---|---|---|---|---|---|
|  | 375° F. |  | 400° F. |  |  |  |
|  | 20 min. |  | 10 min. |  | 15 min. |  |
| Coating Powder | J | C.E. 3 | J | C.E. 3 | J | C.E. 3 |
| Impact |  |  |  |  |  |  |
| Direct | 60 | 20 | 20 | 60 | 160 | 160 |
| Reverse | 20 | fail | fail | 40 | 160 | 160 |
| Pencil hardness | F | F | F | F | F | F |
| Gloss |  |  |  |  |  |  |
| 20° | 76 | 79 | 79 | 76 | 70 | 76 |
| 60° | 92 | 94 | 95 | 93 | 90 | 93 |
| MEK resistance | 3 | 1 | 1 | 2 | 4 | 4 |
| Outgass | 6.6 | 4.3 | — | — | 3.5 | 3.3 |
| (mils) | 6.8 | 4.5 |  |  | 3.6 | 3.4 |

The subject matter claimed is:

1. A storage-stable, partially cured powder coating resin free of gelation comprising a reaction mixture of a linear, hydroxyl-terminated polyester resin having an OH value of from 15 to 55 and methoxymethyl aminotriazine at a weight ratio of resin to triazine of from about 97:3 to about 70:30 in which a portion, corresponding to a reaction efficiency of from about 5% to about 15%, of methanol by-product has been removed at a temperature of from 150° to about 170° C.

2. A powder coated article having a smooth, pin hole-free film of a hydroxyl-terminated, linear polyester resin having an OH value of from 15 to 55 cured with a methoxymethyl aminotriazine as the sole curing agent at a temperature of from about 190° to about 250° C. for from about 5 to about 30 minutes.

3. The article of claim 2 wherein the curing temperature is about 190° C. (375° F.) and the film has a minimum thickness of about 6.6 mils.

4. The article of claim 2 characterized further in that the film contains from about 5 to about 10 parts of triazine residue per hundred parts of the polyester.

5. A method for preparing a partially cured, nongelled, storage stable powder coating resin comprising mixing a hdyroxyl-terminated linear polyester resin having an OH value of from 15 to 55 and from about 3% to about 30% of a methoxymethyl aminotriazine, by weight of the resin/triazine mixture, heating the mixture at from 150° C. to about 170° C. and reducing the pressure on the mixture to remove a portion, corresponding to a reaction efficiency of from about 5% to about 15%, of methanol formed by reaction of the resin and triazine.

6. The partially cured powder coating resin of claim 1 wherein the resin is made from at least one dicarboxylic acid selected from the class consisting of phthalic acid, tetra- and hexahydrophthalic acid and their anhydrides, terephthatlic acid, isophthalic acid, 1,3- and 1,4-cyclohexane dicarboyxlic acids, adipic acid, sebacic acid, and hydroxypivalic acid, or an ester of such acid or acids, and a dihydric alcohol.

7. The powder coated article of claim 2 wherein said resin is made from at least one dicarboxylic acid selected from the class consisting of phthalic acid, tetraand hexahydrophthalic acid and their anhydrides, terephthalic acid, isophthalic acid, 1,3- and 1,4-cyclohexane dicarboxylic acids, adipic acid, sebacic acid, and hydroxypivalic acid, or an ester of such acid or acids, and a dihydric alcohol.

8. The method of claim 5 wherein the resin is made from at least one dicarboxylic acid selected from the class consisting of phthalic acid, tetra- and hexahydrophthalic acid and their anhydrides, terephthalic acid, isophthalic acid, 1,3- and 1,4-cyclohexane dicarboxylic acids, adipic acid, sebacic acid, and hydroxypivalic acid, or an ester of such acid or acids, and a dihydric alcohol.

9. The partially cured powder coating resin of claim 1 wherein the OH value is from 20 to 35.

10. The coating resin of claim 1 wherein the polyester has an acid value of up to about 10.

11. The powder coated article of claim 2 wherein the OH value is from 20 to 35.

12. The article of claim 2 wherein the polyester resin has an acid value of up to about 10.

13. The method of claim 5 wherein the polyester resin has an OH value of from 20 to 35.

14. The method of claim 5 wherein the polyester resin has an acid value of up to about 10.

* * * * *